United States Patent [19]
Bates

[11] Patent Number: 5,251,670
[45] Date of Patent: Oct. 12, 1993

[54] FLUSH VALVE

[76] Inventor: Lyle D. Bates, 16107 44th Ave. E., Tacoma, Wash. 98446

[21] Appl. No.: 721,085

[22] Filed: Jun. 25, 1991

[51] Int. Cl.$^5$ .............................. F16K 11/074
[52] U.S. Cl. .................. 137/625.46; 137/597; 137/874; 251/297
[58] Field of Search ............ 137/625.46, 597, 616.7, 137/874; 251/149.8, 341, 297

[56] References Cited

U.S. PATENT DOCUMENTS

| | | |
|---|---|---|
| 1,968,391 | 7/1934 | Hamilton .................. 251/341 X |
| 3,283,498 | 11/1966 | Connell . |
| 3,550,612 | 12/1970 | Maxon . |
| 3,874,317 | 4/1975 | Hikita . |
| 4,133,284 | 1/1979 | Holcroft . |
| 4,457,727 | 7/1984 | Flaig . |
| 4,533,331 | 8/1985 | Bland . |
| 4,619,618 | 10/1986 | Patti . |

FOREIGN PATENT DOCUMENTS

563033 5/1957 Italy .................. 137/625.46

*Primary Examiner*—Arnold Rosenthal
*Attorney, Agent, or Firm*—R. Reams Goodloe, Jr.

[57] ABSTRACT

Flush valves for alternately supplying freshwater or seawater coolant to marine engines. Such valves, used in combination with a marine engine cooling system, facilitate flushing of contaminants. In one embodiment, the valve includes a first portion having inlet conduits, a second portion having outlet conduits, and means for rotatably securing the first and second portions together with minimal gap therebetween. Inlet and outlet portions are alternately positioned in a first, single fluid flow relationship (seawater supply) wherein only a first fluid is directed through outlet conduits, or in a second, multiple fluid flow relationship (flushing operation) wherein both a first and a second fluid are sent to outlet conduits. Also, sealing means is provided between the first and second portions to prevent liquid from escaping through the gap therebetween. In another embodiment, the inlet and outlet portions are stationary and a coupling means situated between the portions is alternately positioned to switch the fluid flow relationship. In yet another embodiment, the coupling means is alternately positioned in a first, dual fluid flow relationship, or in a second dual fluid flow relationship wherein the fluid delivered to the outlet conduits is reversed. The valves may also be useful in industrial applications.

7 Claims, 8 Drawing Sheets

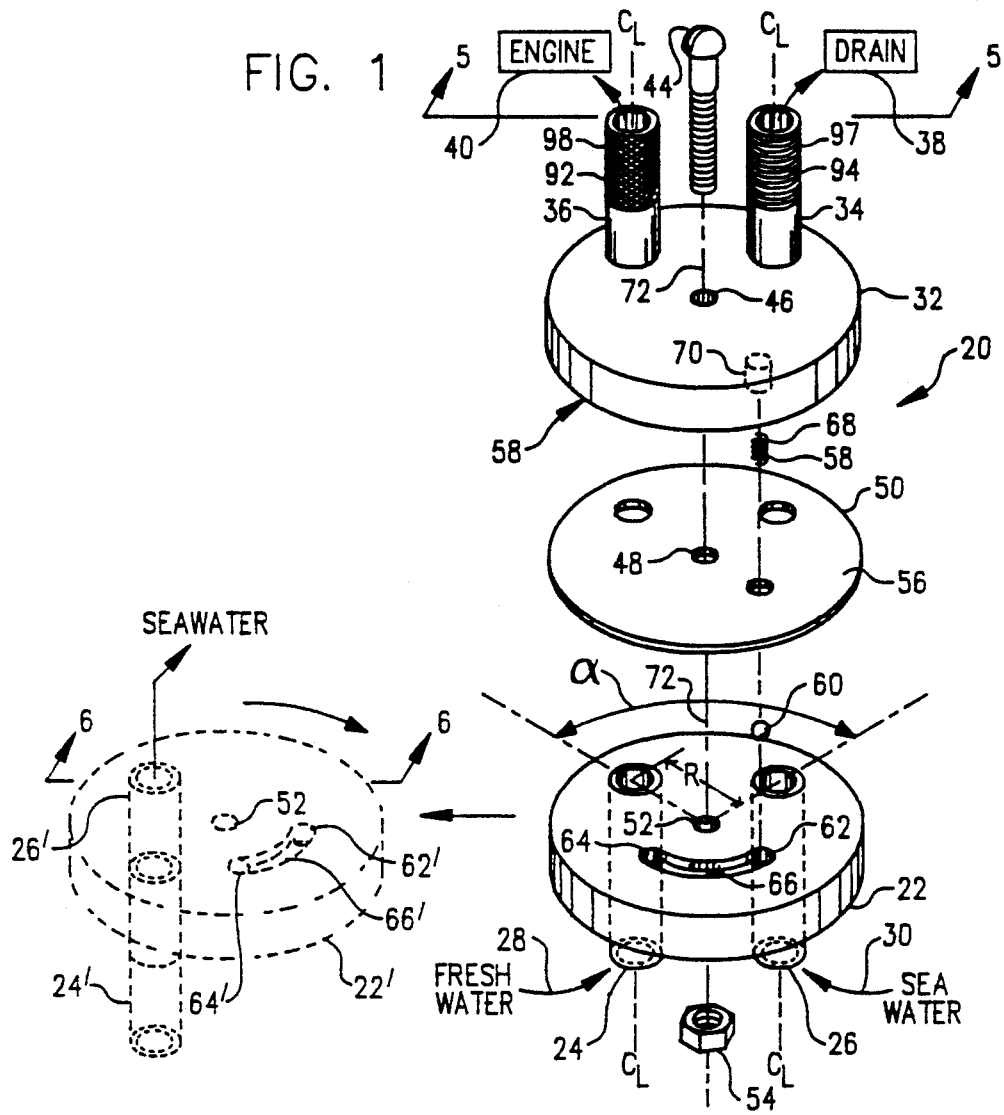

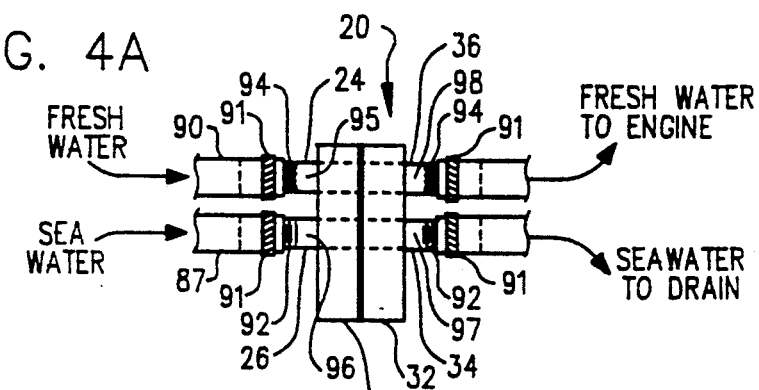
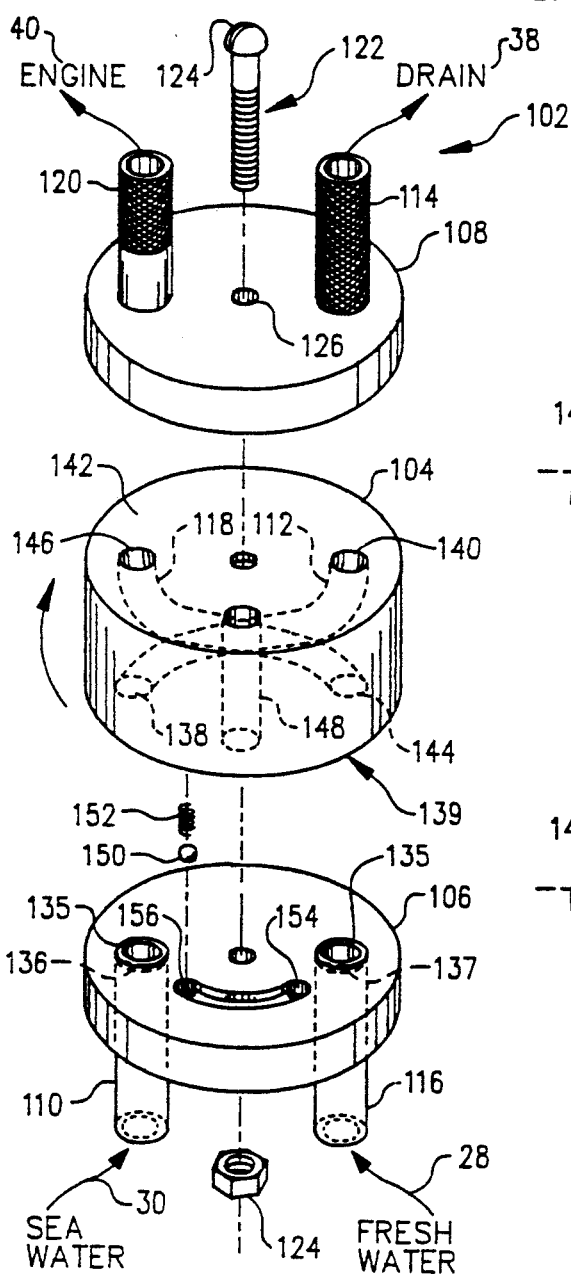
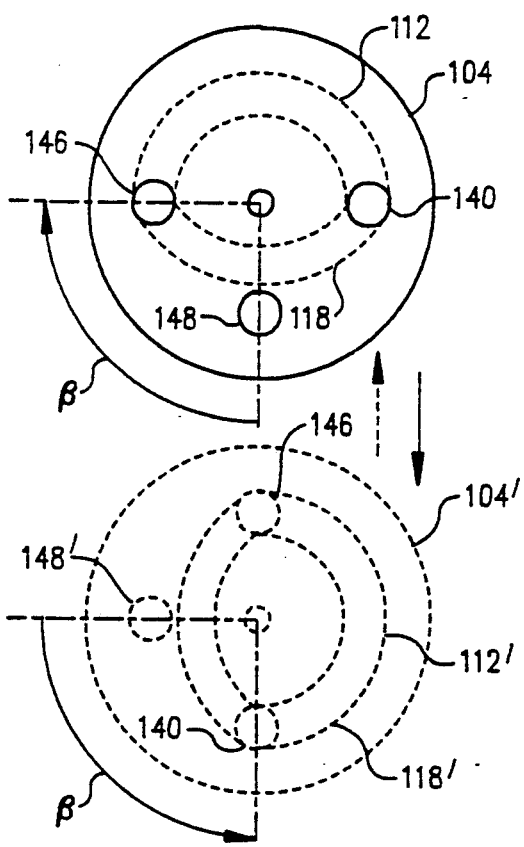

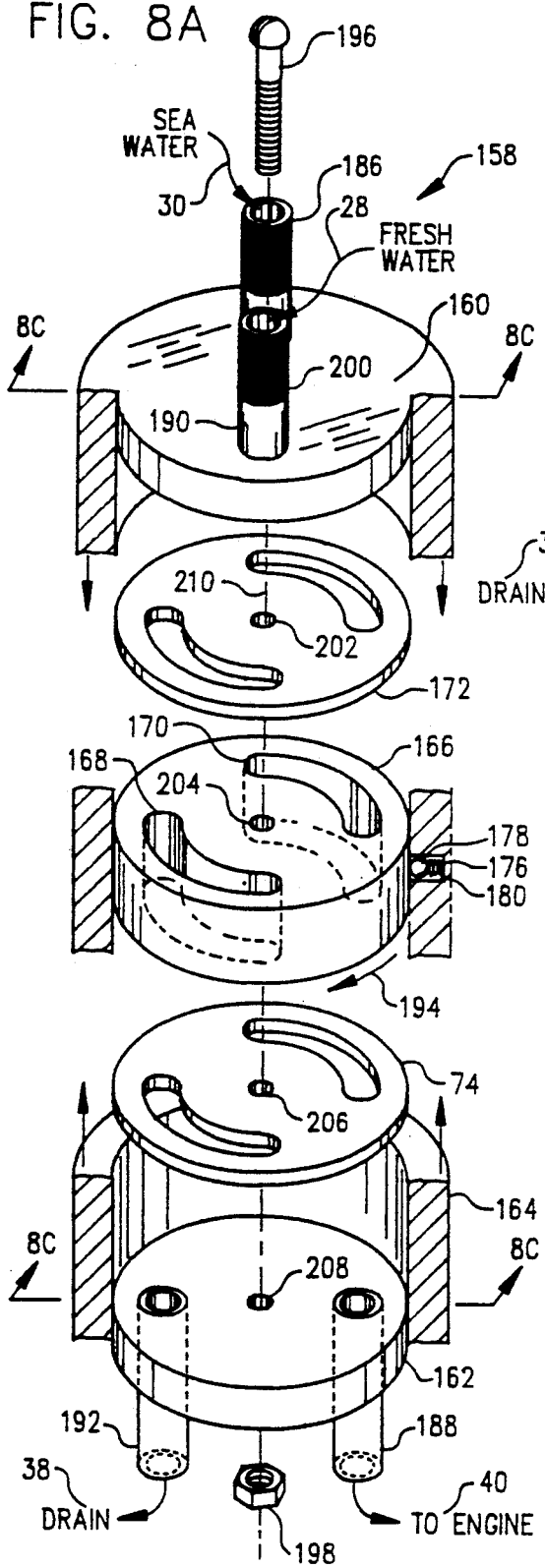
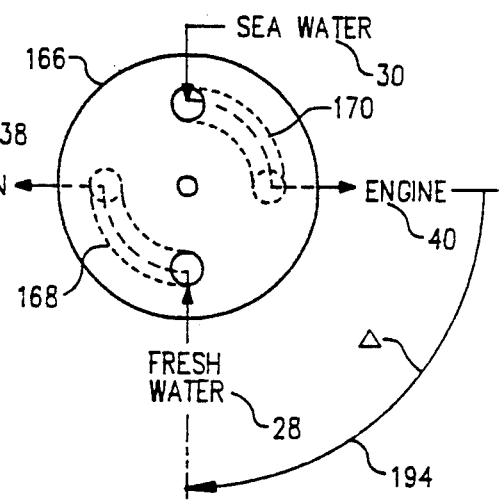
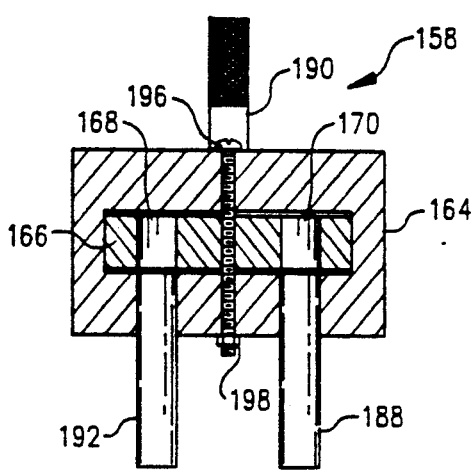

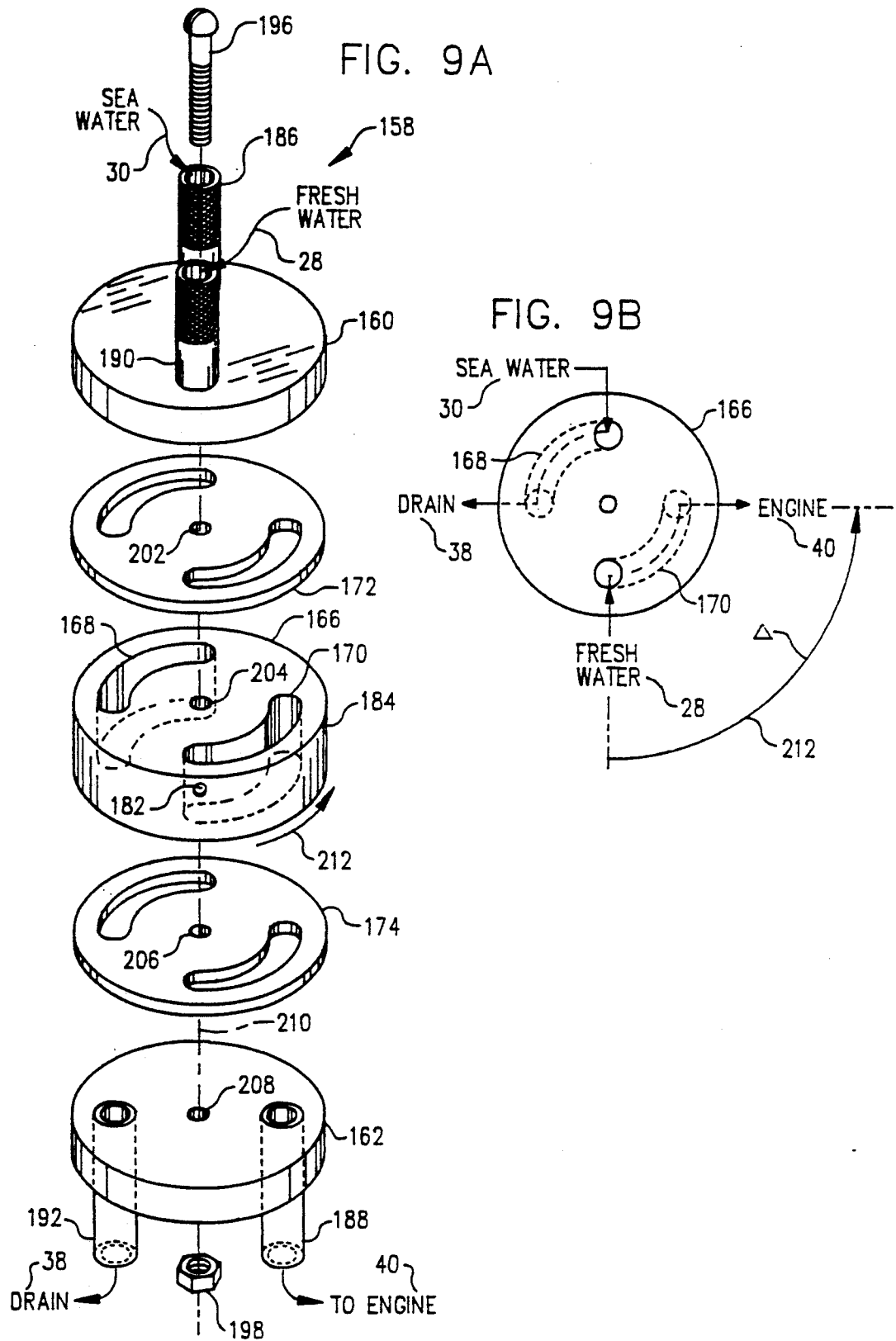

FLUSH VALVE

TECHNICAL FIELD OF THE INVENTION

This invention relates to novel, improved valves for quickly changing the source of liquid(s) to be delivered through a valve. Devices of that character are particularly useful for flushing saline water from marine engines by supply of fresh water, and such devices will for the most part be referred to herein as flush valves.

BACKGROUND OF THE INVENTION

A continuing demand exists for a simple, inexpensive mechanical device which can be used to change the source of liquid(s) to be delivered through the device. The need for such devices is commonly seen in conjunction with the use of marine engines, where it is desirable to flush corrosive saline water from the engines, particularly when temporarily discontinuing their use. This is because waters upon which boats are operated are contaminated to at least some degree with salts or other harmful minerals, or with particulates such as mud and silt; if such contaminants are allowed to stay in the engine, scaling, corrosion and/or erosion can occur. As a result, there are concomitant adverse effects on engine life and maintenance costs.

In this document, the term "seawater," while used to particularly describe saline marine waters, also shall be understood to include and generally describe any undesirable or contaminated water or other fluid, it being understood that such fluids may not necessarily be seawater but may be fresh or brackish waters that nevertheless may contain contaminants which need to be flushed from an apparatus by another fluid. Further, such reference might be, instead of to water, to one fluid in an industrial setting where flushing with a second fluid would be desirable. Further, the flush valve described herein may have other uses and purposes familiar to those to whom this specification is addressed.

Devices of the character described above which provide the general capabilities desired have heretofore been proposed. Those of which I am aware are disclosed in U.S. Pat. No. 4,619,618 issued Oct. 28, 1986, to Patti for FRESH WATER FLUSHING KIT; and U.S. Pat. No. 3,550,612 issued Dec. 29, 1970, to Maxon for PURGE VALVE FOR COOLING FLUID CONDUIT SYSTEMS.

For the most part, the patent documents identified in the preceding paragraph disclose devices which include an elongated pipe portion to which multiple flow regulating devices are appended. Such devices inherently require proper performance of sequential steps to begin a flushing operation, and then a reversal of those steps to terminate the flushing and thus allow normal coolant flow. In fact, the combination of complicated operational procedures, fluid flow design, and the normal physical location of such prior art devices often presents the risk that an improper operational procedure will expose a vessel to taking on seawater, thus giving rise to the potential danger of sinking.

In Patti, a complicated assembly of components is seen. Patti's device consists of a long tubular assembly having a shutoff valve between a seawater inlet and outlet, a second shutoff valve between a fresh water inlet and outlet, as well as a closure device (cover plate) at the fresh water inlet. As the cover plate must be removed and replaced for each flush operation, the opportunity for improper operation and resultant danger to the vessel is ever present.

In Maxon, a device including a ball valve is situated in the saline coolant flow line. The ball in the valve is displaced upon normal flow of saline coolant, thus allowing passage of the coolant. When the flushing liquid is fed to the device, the ball valve is displaced in the opposite direction, described as downwardly to a valve seat, to thereby prevent saline coolant from being introduced to the engine through the valve. While the Maxon device avoids the operational complexity of Patti, the constant exposure of the various valve seats to corrosive saline coolant creates the likelihood of deposition of contaminants on and corrosion of the seat, thus creating an inherently unreliable liquid seal over the lifetime of a vessel. Over time, such a result would likely compromise the purity of any flushing fluid.

Another common deficiency of the heretofore available flush valves is the absence of a readily apparent visual indication to the operator that the flow of liquid into the engine may occur and that such flow is from the desired source. The advantage of such an indication is important and self-evident.

SUMMARY OF THE INVENTION

I have now invented, and disclose herein, certain novel, improved flush valves which do not have the above-discussed drawbacks common to those heretofore used flush valves of which I am aware. Unlike flush valves heretofore available, my valve is simple, compact, relatively inexpensive, light, easy to install and remove for servicing, and otherwise superior to the heretofore proposed ones.

My novel flush valves differ from those valves mentioned above in one respect in that they have a simple fluid diverting portion which can be operated in the open or seawater cooling position, or which can be operated in the closed or freshwater flushing position. As a consequence the operator can elect to place the valve in the desired position by a simple rotation of a portion of the device.

I have now developed flush device for use in combination with a marine engine cooling system for facilitating the flushing of contaminants from the cooling system, so as to inhibit the deterioration of the cooling system. The flush valve may be used with the type of cooling system having an engine, a seawater intake, and a seawater discharge. The flush device includes a first portion which includes a set of inlet conduits, and a second portion which includes a set of outlet conduits, and means for rotatably securing the first and second portions together with minimum gap between the portions. In one embodiment, the inlet and outlet portions are alternately positioned in a first, single fluid flow relationship wherein a single fluid is allowed to flow through said set of inlet conduits, or in a second, multiple fluid flow relationship wherein a first fluid and a second fluid are allowed to flow through said set of inlet conduits and thence outward through said set of outlet conduits. Also, sealing means is provided between the first and second portions for preventing liquid from escaping through the gap therebetween.

In another embodiment, the inlet and outlet portions are stationary and a coupling means is interposed between those portions. The coupling means is alternately positioned in a first, dual fluid flow relationship or in a second, dual fluid flow relationship. In the first fluid flow relationship, a first fluid flows in through the first inlet conduit, thence out through the first outlet conduit; simultaneously, a second fluid flows in through the second inlet conduit, thence out through the second outlet conduit. In the second fluid flow relationship of this embodiment, by rotation of the coupling means, the first fluid is directed toward and thence out of the second outlet conduit, and the second fluid is directed toward and thence out of the first outlet conduit.

Other embodiments provide further variations in flow configuration and in provision of the sealing means.

Aside from the foregoing, my novel devices are simple, durable, and relatively inexpensive to manufacture.

OBJECTS, ADVANTAGES, AND FEATURES OF THE INVENTION

From the foregoing, it will be apparent to the reader that one important and primary object of the present invention resides in the provision of novel, improved mechanical devices to provide a means for flushing liquids from marine engines, thereby preventing or reducing corrosion damage to such engines.

Other important but more specific objects of the invention reside in the provision of flush valves as described in the preceding paragraph which:
- allow the flushing operation to be done in a simple, one step manner;
- are relatively simple;
- are comparatively light;
- are relatively compact and thereby conserve space;
- in conjunction with the preceding object, have the advantage that they can be installed in a convenient location for easy access during operation;
- easily provide by simple observation an indication to the operator, while the flushing operation is being conducted, of the source of coolant;
- are relatively inexpensive;
- are easy to install and remove; and
- have a rotatably manipulable member with a first position through which saline coolant can flow during normal operation, and which by manual or mechanized operation can be re-engaged at a second position through which freshwater can flow during a flushing cycle, thereby allowing fresh water to enter the engine to prevent corrosion damage to critical components.

Other important objects, features, and additional advantages of my invention will become apparent to the reader from the foregoing and the appended claims and as the ensuing detailed description and discussion proceeds in conjunction with the accompanying drawing.

BRIEF DESCRIPTION OF THE DRAWING

In the drawing:

FIG. 1 is an exploded perspective view of a flush valve constructed in accord with the principles of the present invention, shown in the flushing position, and also showing in hidden lines the normal operational position of the valve with seawater coolant being supplied to an engine.

FIG. 2 is a schematic of a engine room of a boat having a cooling system constructed in accordance with the teachings of the present invention, shown during normal operation with seawater coolant flow.

FIG. 3 is a schematic of a boat incorporating an engine having a cooling system constructed in accordance with the teachings of the present invention, shown during flushing operation.

FIG. 4 is a pictorial view of a flush valve constructed in accord with the teachings of the present invention, illustrating a flow diagram for the valve during normal operation with seawater coolant flow.

FIG. 4A is a view similar to FIG. 4, but with the flush valve repositioned to illustrate a flow diagram for the device during flushing of an engine with fresh water.

FIG. 5 is a vertical cross sectional view taken along the line 5—5 of FIG. 1, with the flush valve positioned for flushing of an engine with fresh water.

FIG. 6 is a vertical cross sectional view taken along the line 6—6 of FIG. 1, with the flush valve positioned for normal operation with seawater coolant flow.

FIG. 7A is an exploded perspective view of a second embodiment of my invention, wherein ends providing hydraulic connections may remain fixed and a center rotating element is provided to rotate between a normal and a flushing position; this FIG. 7A shows operation in the flushing position.

FIG. 7B is a top plan view, i.e., looking down at the center rotating element first illustrated in FIG 7A, and also showing in hidden lines the center rotating element when repositioned to a normal seawater coolant flow position.

FIG. 8A is an exploded perspective view of a third embodiment of my invention providing for continuous flow of both fresh and seawater even when freshwater flushing operations are performed, shown here in the normal seawater coolant flow position.

FIG. 8B is a schematic illustrating a flow diagram for the valve first illustrated in FIG. 8A, showing normal operation with seawater coolant flow.

FIG. 8C is a vertical cross sectional view of the valve first illustrated in FIG. 8A, taken along the line 8C—8C of FIG. 8A.

FIG. 9A is a view similar to FIG. 8A, but showing the third embodiment valve first shown in FIG. 8A in its alternate, flushing position.

FIG. 9B is a schematic similar to that shown in FIG. 8B, but showing the valve in the flushing position with fresh water being supplied to the engine.

DETAILED DESCRIPTION OF THE INVENTION

Figure 10:
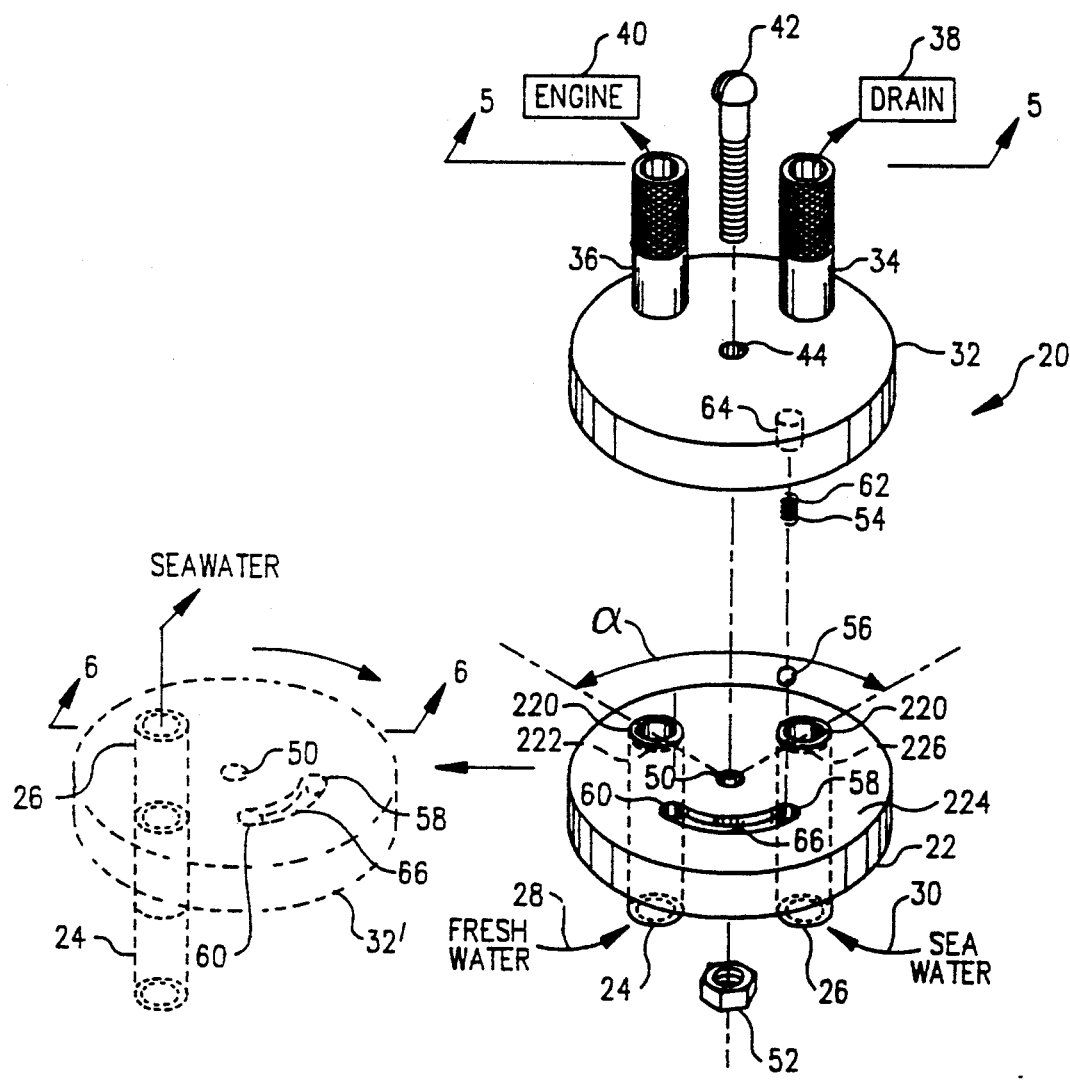
FIG. 10 is a fourth embodiment of my invention, similar to the design first set forth in FIG. 1, however utilizing o-rings instead of gaskets to prevent leaks.

Referring now to the drawing, FIG. 1 depicts, in its operative flushing position, a flush valve 20 constructed in accord with, and embodying, the principles of the present invention.

Major components of the flush valve 20 include: an inlet portion 22 which includes a first inlet conduit or passage 24 and a second inlet conduit or passage 26, for freshwater 28 and seawater 30 respectively, and an outlet portion 32 which includes a first outlet conduit or passage 34 and a second outlet conduit or passage 36. The first outlet passage 34 is fluidly connected to disposing means such as drain 38, which is used for disposal of undesired fluid, normally the fluid not then being utilized for cooling of engine 40. The second outlet passage is fluidly connected to the fluid user, normally engine 40 which requires supply of either freshwater 28 or seawater 30 for cooling.

Inlet portion 22 is rotatably secured to outlet portion 32 by way of axis means which can take the form of the working combination of bolt 4 which extends through a series of central apertures (aperture 46 in outlet portion 32, aperture 48 in seal 50, and aperture 52 in inlet portion 22), and a fastener such as nut 54 which may threadably engage bolt 44. The securing means such as bolt 44 and nut 54 provides an axis of rotation so that the inlet portion 22 may be rotated relative to the outlet portion 32 yet be securely held in a close fitting fluidly sealed relationship with minimum gap therebetween.

Leakage from the valve 20 is controlled by seal means such as seal 50. Seal 50 may be permanently positioned by adhesively bonding or otherwise securing the upper side 56 of the seal 50 to the underside (not visible) 58 of outlet portion 32. The exact thickness of seal means may be varied as required to utilize materials at hand, although it is preferred that the gap between inlet portion 22 and outlet portion 32 be minimized, thus leading toward thin disk shaped seals 50 on the order of about 3.175 mm ($\frac{1}{8}$") or less.

The inlet portion 22 and outlet portion 32 are alternately releaseably secured relative to one another at a first, flushing position (inlet portion 22 location as illustrated in FIG. 1), and at a second, seawater cooling position (inlet portion 22' as illustrated in hidden lines in FIG. 1). For convenience of the reader, those previously referenced parts which are displaced by movement of inlet portion 22 to location 22' are likewise referenced by a prime mark (') designation.

Registration between inlet portion 22 and outlet portion 32 is achieved by a keeper means, which includes urging means that may take the form of a spring 58 which in turn biases a ball 60 toward the then below locating means which may be first detent 62, second detent 64, or the track 66 therebetween. The ball 60 is thereby alternately seated in detents 62 (when at the normal, seawater supply position) or 64 (when at the flush, freshwater supply position). The upper end 68 of the spring 58 may be fixed to or caged by a well 70 which extends upwardly into outlet portion 32. When the inlet portion 22 is rotated relative to outlet portion 32, ball 60 is displaced from first detent 62 and tracks along the curvelinear groove or track identified by reference character 66 in FIG. 1, until the ball 60 becomes located at second detent 64. The registration mechanism just described is so constructed that it provides precise vertical alignment of the inlet portion 22 and the outlet portion 3 at either the flushing position of inlet portion 22 or the normal operation position indicated by 22'. Thus, during flushing operations, the first inlet conduit 24 (providing freshwater 28) is aligned with the second outlet conduit 36 (sending freshwater 28 to engine 40), and the second inlet conduit 26 (connected to the source of seawater 30) is aligned with the first outlet conduit 34 (sending the seawater 30 to a drain 38). Also, during normal cooling operations utilizing seawater 30, the second inlet conduit 26 (connected to the source of seawater 30) is aligned with the second outlet conduit 36 (sending the seawater 3 to engine 40). It should also be noted that during normal cooling operations, there is no inlet conduit positioned in a fluid flow relationship with the first outlet conduit 34.

The axial movement of the inlet portion 22 relative to outlet portion 32 may be by any predetermined angle alpha ($\alpha$) which is convenient in the fabrication of the valve 20. The actual angle alpha ($\alpha$) utilized is determined by the selected location of the various inlet and outlet conduits, and the size of those conduits. As illustrated, the sets of inlet and outlet conduits are spaced radially outward from the a central axis 72 by a distance R (on a centerline to centerline basis), with the centerlines of inlet conduits 24 and 26, and likewise the centerlines of outlet conduits 34 and 36, spaced apart angularly by an angle alpha ($\alpha$) of 90°. However, depending upon the size of the valve 20, most any angle between about thirty degrees (30°) and one hundred eighty degrees (180°) may be conveniently utilized; a lesser angle may be possible where clearances permit.

It will be readily apparent to the reader that the present invention may be easily adapted to other embodiments incorporating the concepts taught herein and that the present FIG. 1 is shown by way of example only and not in any way a limitation. As to embodiments illustrated in the following figures, like parts will be noted with common reference numerals without further discussion thereof.

Figures 2, 3, 4:
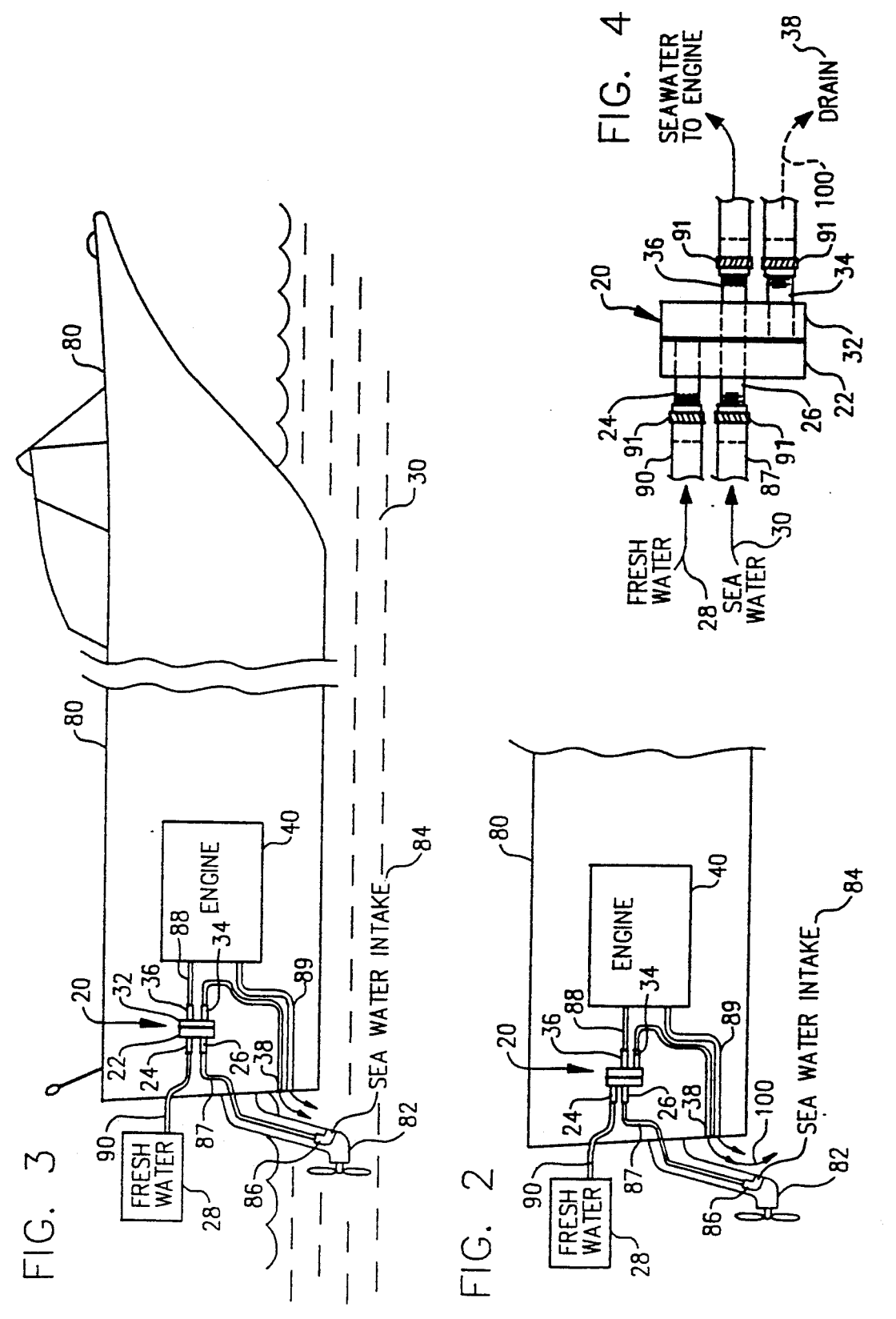

Turning now to FIGS. 2 and 3, the operation of valve 20 is illustrated in conjunction with one anticipated use, as a flushing valve in marine engine cooling systems. In FIG. 2, a boat 80 having an engine 40 is illustrated in operation on a body of water such as seawater 30. A typical cooling system for inboard/outboard type marine engines such as that illustrated includes an outdrive portion 82 having a seawater intake 84 which supplies seawater 30 to a pump means 86, which in turn supplies the seawater 30 via intake line 87 through valve 20 and thence via supply line 88 to the water cooling passages or jacket (not shown) of engine 40. Discharge of seawater 30 from engine 40 is by way of discharge line 89 which in some cases may include exhaust gases from the engine 40.

When the valve 20 of the present invention is employed in conjunction with the just described engine cooling system, as is illustrated in FIG. 2, seawater 30 is supplied to engine 40 through valve 20. Seawater enters valve 20 through second inlet conduit 26 of inlet portion 22. Second inlet conduit 26 is aligned with the second outlet conduit 36, whereby seawater 30 may pass through outlet portion 32 via way of second outlet conduit 36. The alignment of the second inlet conduit 26 with the second outlet conduit 36 thus allows seawater 30 to be directed to engine 40 as necessary for normal cooling purposes.

While the outdrive 82 type engine 40 is illustrated in FIG. 2., it must be appreciated that valve 20 may also be applied to other types of engines or other apparatus requiring flushing.

After running an engine 40 in the seawater cooling position illustrated in FIG. 2, it is advantageous to flush out the engine 40 with freshwater 28. Normal operation of flush valve 20 involves turning off engine 40, then changing valve 20 to a flushing position as indicated in FIGS. 3 and 4A, and then restarting engine 40 with freshwater 28 supplied to engine 40 through valve 20. After the desired freshwater flushing has occurred, then engine 20 is again stopped, and valve 20 is repositioned to its normal seawater supply position as indicated in FIGS. 2 and 4, so that the engine 40 is ready for normal operation on the body of water 30.

In the flushing operation as illustrated in FIG. 3, the inlet portion 22 of valve 20 has been rotated relative to the outlet portion 32 to a flushing position so that incoming seawater 30 is supplied through inlet conduit 26, and thence proceeds to outlet conduit 34 and immediately to overboard drain 38. It is important to provide a drain 38 for the seawater 30 because in many outdrive engine type cooling systems, seawater 30 is always provided by full time operation of a positive displacement type pump means 86. Therefore, the pumped seawater 30 must have an outlet to avoid damage to the pump means 86 or other parts of the engine cooling system.

Freshwater 28 is supplied from freshwater line 90 through valve 20 via inlet conduit 24. Inlet conduit 24 is aligned with outlet conduit 36 to thereby direct freshwater for flushing and cooling for engine 40. Freshwater 28 exiting the engine is dumped overboard via way of line 88, which, in some boats 80, may include exhaust gases from engine 40.

FIGS. 4 and 4A depict in greater detail the functioning of valve 20 when employed a set forth in FIG. 2 and FIG. 3, respectively. Freshwater 28 is supplied by freshwater line 90 to the first inlet conduit 24 of valve 20. Seawater 30 is supplied by seawater intake line 87 to the second inlet conduit 26 of valve 20.

Lines 87 and 90 may be secured to inlet conduits 24 and 26 by common pipe clamps 91 or by other securing means. The security of the attachment may be assisted by adding a friction means such as a barbed or hooked surface 92 pattern or a knurled surface 94 pattern to the external surfaces 95 and 96 of the first 24 and second 26 inlet conduits, or external surfaces 97 and 98 of the first 34 and second 36 outlet conduits (as better illustrated in FIG. 1 above) or other appropriate technique. The same technique may likewise be applied to any inlet or outlet conduits in other embodiments of the invention, even though, for example, in FIGS. 4 and 4A, friction means such knurling 94 and barbed surface 92 is largely hidden below inlet lines 90 and 92.

In FIG. 4, when seawater 30 is being supplied to through valve 20 to the engine 40, there is no freshwater 28 being supplied through valve 20, and therefore there is no water going to drain a indicated by the broken line 100 to the noted drain 38. It is clear from FIG. 4 and FIG. 1 that when only seawater is being supplied to valve 20, there is no alignment between the drain and any source of water.

Turning now to FIG. 4A, when the valve 20 is illustrated in the flushing position. Here, inlet portion 22 has been rotated relative to outlet portion 32. Seawater 20 may still be sent to valve 20, where the seawater 20 is routed through inlet conduit 26 and outlet conduit 34 and thence to the drain 38. More importantly, freshwater 28 is supplied to and thence through valve 20, via way of inlet conduit 24 and outlet conduit 36, and thence to the engine 40 from which undesired contaminants such as corrosive salts, silt, etc., may be flushed.

It is clear from the heretofore described figures that the flush valve 20 of the present invention provides a simple valve which may be easily rotated between operating positions, and which may be releaseably secured at either position. Also, simple visual inspection will clearly indicate to an operator the actual position of the valve, so that inadvertent operation without coolant or with an undesired coolant may be avoided.

Referring now to FIGS. 5 and 6, the two operational positions of the valve 20 are shown in vertical cross-section, taken across lines 5—5 and 6—6 of FIG. 1, respectively. FIG. 5 depicts, in a flushing position, the valve 20 first illustrated in FIG. 1. Here, the inlet portion 22 inlet conduits 24 and 26 are in a fluid flow relationship with the outlet portion 32 outlet conduits 34 and 36. More particularly, first inlet conduit 24 has an interior fluid passageway 24-p which connects to the interior fluid passageway 36-p of second outlet conduit 36. The second inlet conduit 26 has an interior fluid passageway 26-p which connects to the interior fluid passageway 34-p of first outlet conduit 34.

FIG. 6 depicts the valve 20 in a normal seawater coolant supply position. This position was first illustrated in FIG. 1 by way of the broken line of inlet portion 22'. Here, it can be seen that the second inlet conduit 26' has an interior fluid passageway 26'-p which connects to the interior fluid passageway 36-p of second outlet conduit 36, thus directing seawater supply to the engine 40.

FIG. 7A illustrates a second embodiment of my invention, different from the first embodiment in that valve 102 has a rotating central coupling means 104. Inlet portion 106 and outlet portion 108 are stationary, unlike the embodiment first illustrated in FIG. 1, wherein the inlet portion 22 and outlet portion 32 moved relative to one another.

In FIG. 7A, the valve 102 is depicted in the flushing position wherein seawater 30 enters a first inlet conduit 110 of inlet portion 106, then moves upward through a first passageway 112 through coupling means 104, thence outward through first outlet conduit 114 to drain 38. Likewise, freshwater 28 enters a second inlet conduit 116 of inlet portion 106, then moves upward through a second passageway 118 through coupling 104, and thence out through a second outlet conduit 120 in outlet portion 108 to engine 40.

In a manner quite similar to the first embodiment, coupling means 104 is rotatably secured between inlet portion 106 and outlet portion 108 by way of securing means 122 which can take the form of the working combination of bolt 124 which extends through a series of central apertures (aperture 126 in outlet portion 108, aperture 128 in coupling 104, and aperture 130 in inlet portion 106), and a fastener such as nut 132 which may threadably engage bolt 124. The securing means such as bolt 124 provides an axis of rotation 134 so that the coupling means 104 may be rotated relative to both the inlet portion 106 and the outlet portion 108 yet be securely held in a close fitting fluidly sealed relationship therebetween. Seal means may include O-rings 135 which ar seated above the slightly recessed upper ends 136 and 137 of inlet conduits 110 and 116. Alternately, seal means may include a flat gasket type seal as first illustrated in FIG. 1.

Returning to FIG. 7A, coupling means 104 provides the fluid connection between the inlet portion 106 and the outlet portion 108. The first passageway 112 has an inlet 138 on the bottom 139 of coupling means 104 and an outlet 140 on top 142 of coupling means 104. The second passageway 118 has an inlet 144 on the bottom 138 and an outlet 146 on the top 142.

FIG. 7B illustrates the alternate positions of coupling means 104 of FIG. 7A. In solid lines, the position of coupling means 104 as first illustrated in FIG. 7A is shown, in the flushing position. In broken lines, the same coupling means 104' is shown rotated by an angle beta ($\beta$) to the alternate, seawater supply position. Although the preselected angle beta may be any convenient angle which avoids interference problems between fluid communication passageways 112, 118, and 148 within the coupling means, I have found that an angle beta of ninety degrees (90°) is normally convenient. Due to the configuration of the passageways in coupling means, angle beta in most instances will not be less than about thirty degrees (30°) nor more than about one hundred fifty degrees (150°).

In the seawater supply position, a third passageway 148' provides the fluid connection between the seawater inlet conduit 110 and the outlet conduit 120, providing seawater cooling to the engine 40. Passageway 148', when returned to the flushing position indicated in full lines in FIG. 7B, is referenced as passageway 148.

Returning now to FIG. 7A, there is also shown a registration or keeper means including positioning ball 150 which may be biased downward by spring means 152 toward detents 154 and 156. The function and operation of the keeper means including ball 150 and detents 154 and 156 and related components are as described above in FIG. 1 and need not be repeated.

Yet another embodiment of my invention is set forth in the related FIGS. 8A, 8B, 8C, 9A, and 9B. First, in FIG. 8A there is provided device similar to that first described in FIG. 7A in that there is provided a valve 158 having a stationary inlet portion 160 and stationary outlet portion 162. However, in FIG. 8A, there is also illustrated a partial housing 164 which is integrally formed with portions 160 and 162 and thereby providing the desired spacing therebetween for rotatably coupling means 166. The coupling means 166, having therein a first fluid passageway 168 and a second fluid passageway 170, is inserted between inlet portion 160 and outlet portion 162 in a close fitting relationship. Upper sealing means 172 and lower sealing means 174 are inserted into the gap between the coupling means 166 and the inlet portion 160, and into the gap between the coupling means 166 and the outlet portion 162, respectively, so as to prevent liquid from escaping from the said gaps. One method of accomplishing sealing means 172 and 174 is to provide a flat gasket like material, one side of which adheres to coupling means 166, and the other side of which provides a rotatable, smooth sealing surface against inlet portion 160 and outlet portion 162.

For registration between coupling means 166 and the inlet 160 and outlet 162 portions, there is provided a spring 176 loaded ball 178 located in well 180 in housing 164. The ball is alternately received in detents 182 and 184 which can be seen in FIG. 9A.

FIG. 8A shows the valve 158 in its normal operational mode with seawater 30 being directed to the engine 40. Seawater 30 enters a first inlet conduit 186, then travels (here downward, but may actually be any desired position) to coupling 166, where it enters the second fluid passageway 170. Passageway 170 directs the fluid therethrough and on to first outlet conduit 188, through which the entering seawater 30 is sent onward to engine 40. The fluid flow pattern just described (for seawater coolant flow) is set forth diagrammatically in FIG. 8B.

In this embodiment, when in the seawater 30 coolant mode, it is also possible for freshwater 28 to enter valve 158 and pass therethrough, which allows a drain line to be flushed with freshwater 28. This can be accomplished as freshwater 28 enters second inlet conduit 190, then passes through passageway 168 of coupling means 166, thence out through second outlet conduit 192.

When it is desired to switch the valve 158 to the flushing position, wherein freshwater 28 is provided to engine 40, coupling means 166 is rotated by an angle delta ($\Delta$) in the direction of reference arrow 194. The exact angle delta may be preselected as any convenient angle wherein the passageways 168 and 170 provide the desired fluid communication, however, I have found it convenient to utilize an angle delta of ninety degrees (90°).

The coupling means is rotatably secured between inlet portion 160 and outlet portion 162 by securing means including bolt 196 and nut 198 which is threadably engaged with bolt 196. Bolt 196 which extends through a series of central apertures (aperture 200 in inlet portion 160, aperture 202 in upper sealing means 172, aperture 204 in coupling 166, aperture 206 in lower sealing means 174, and aperture 208 in outlet portion 162). The securing means provides an axis of rotation 210 so that the coupling means 166 may be rotated relative to both the inlet portion 160 and the outlet portion 162 yet be securely held in a close fitting fluidly sealed relationship therebetween.

When the desired switch to the flushing position has been accomplished, the valve 158 appears as illustrated in FIG. 9A, although for clarity of illustrative purposes, housing 164 (shown in FIG. 8A) has been omitted. Here, freshwater 28 flows into inlet conduit 190, then downward through passageway 170 of coupling 166, and finally out through outlet conduit 188 to engine 40. Simultaneously, seawater 30 is allowed to flow through inlet conduit 186, then downward through passageway 168 of coupling means 166, and finally out through outlet conduit 192 to drain 38. The fluid flow pattern just described (for freshwater 28 coolant flow) is set forth diagrammatically in FIG. 9B. When it is desired to return the valve 158 to the seawater operating position, coupling means 166 is rotated by an angle delta ($\Delta$) in the direction of reference arrow 210.

Turning now to FIG. 8C, a cross sectional view of the device set forth in FIGS. 8A, 8B, 9A, and 9B is provided, taken along the line 8C—8C of FIG. 8A. This cross sectional view includes the housing 164 which was omitted in FIG. 9A.

FIG. 10 is yet another embodiment of my invention, similar to the design first set forth in FIG. 1. However, in this FIG. 10, the sealing means is provided via way of O-rings 220, rather than the previously described seal 50. Also, to allow a seat for O-ring placement the ends of the various conduits are recessed slightly into the inlet and outlet portions. For example, the upper end 222 of inlet conduit 24 is located slightly below upper surface 224 of inlet portion 22. Similarly, the upper end 226 of inlet conduit 26 is located slightly below the upper surface 224 of inlet portion 22. In all other respects, the embodiment shown in this FIG. 10 is as described with regard to the embodiment first described with reference to FIG. 1.

Figure 11:
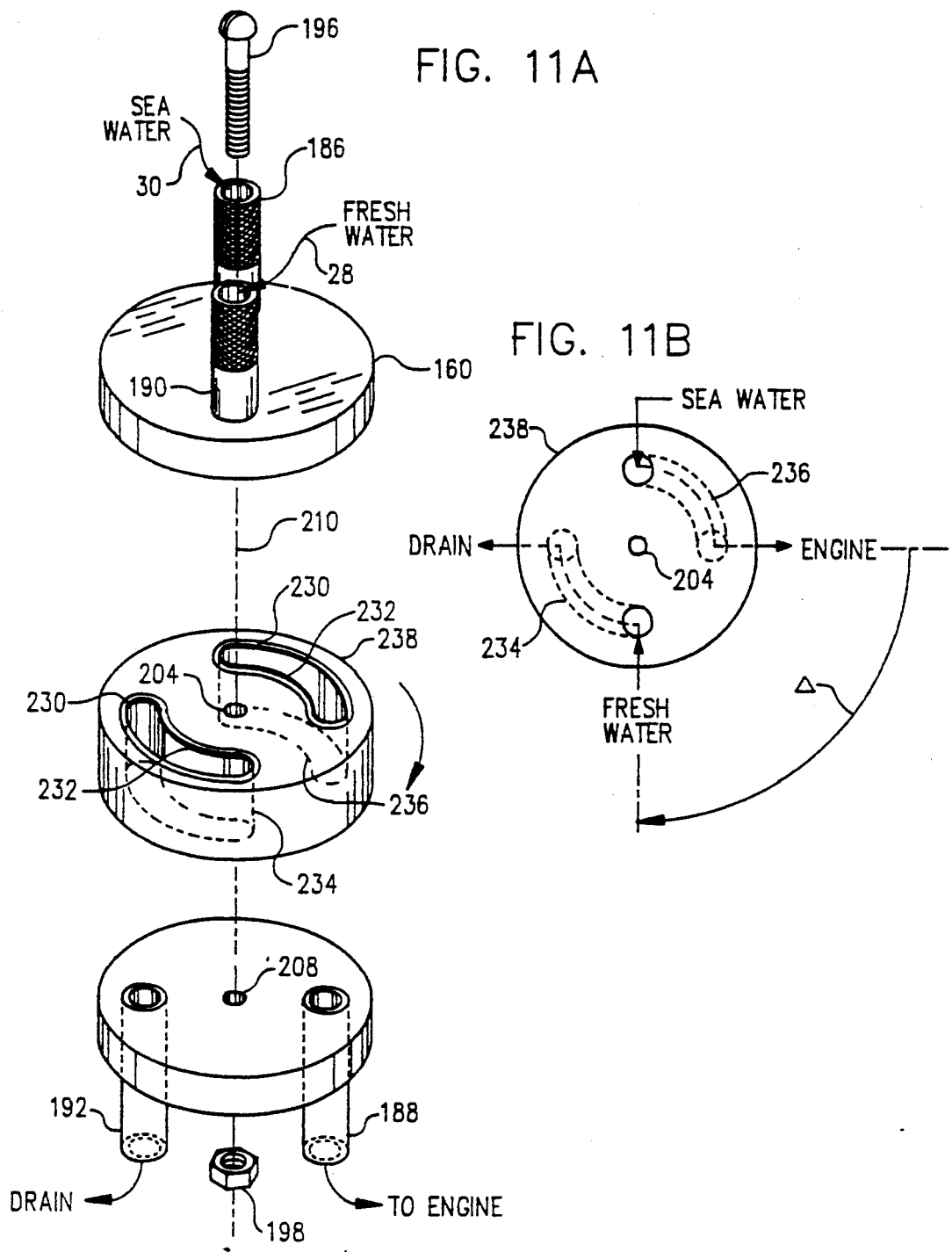
FIG. 11A is a fifth embodiment of my invention, similar to the design first set forth in FIG. 8A, however utilizing o-rings instead of gaskets to prevent leaks.
FIG. 11B is a schematic illustrating a flow diagram for the valve first illustrated in FIG. 11A, showing normal operation with seawater coolant flow.

Still another embodiment of my invention is set forth in FIG. 11A. This embodiment is similar to the design set forth in FIGS. 8A and 9A, and, in that valve 218 is provided with no housing 164 is shown (though it may be used in conjunction with this embodiment), most resembles FIG. 9A. Again here, as in FIG. 10, sealing means is provided by way of O-rings 230, which are located in seats 232 adjacent passageways 234 and 236 in coupling means 238. In other respects, operation of this embodiment is as set forth above with respect to the embodiment described in FIGS. 8A and 9A. For further reference, FIG. 11B sets forth diagrammatically the fluid flow path of the valve 218 shown in FIG. 11A.

Figure 12:
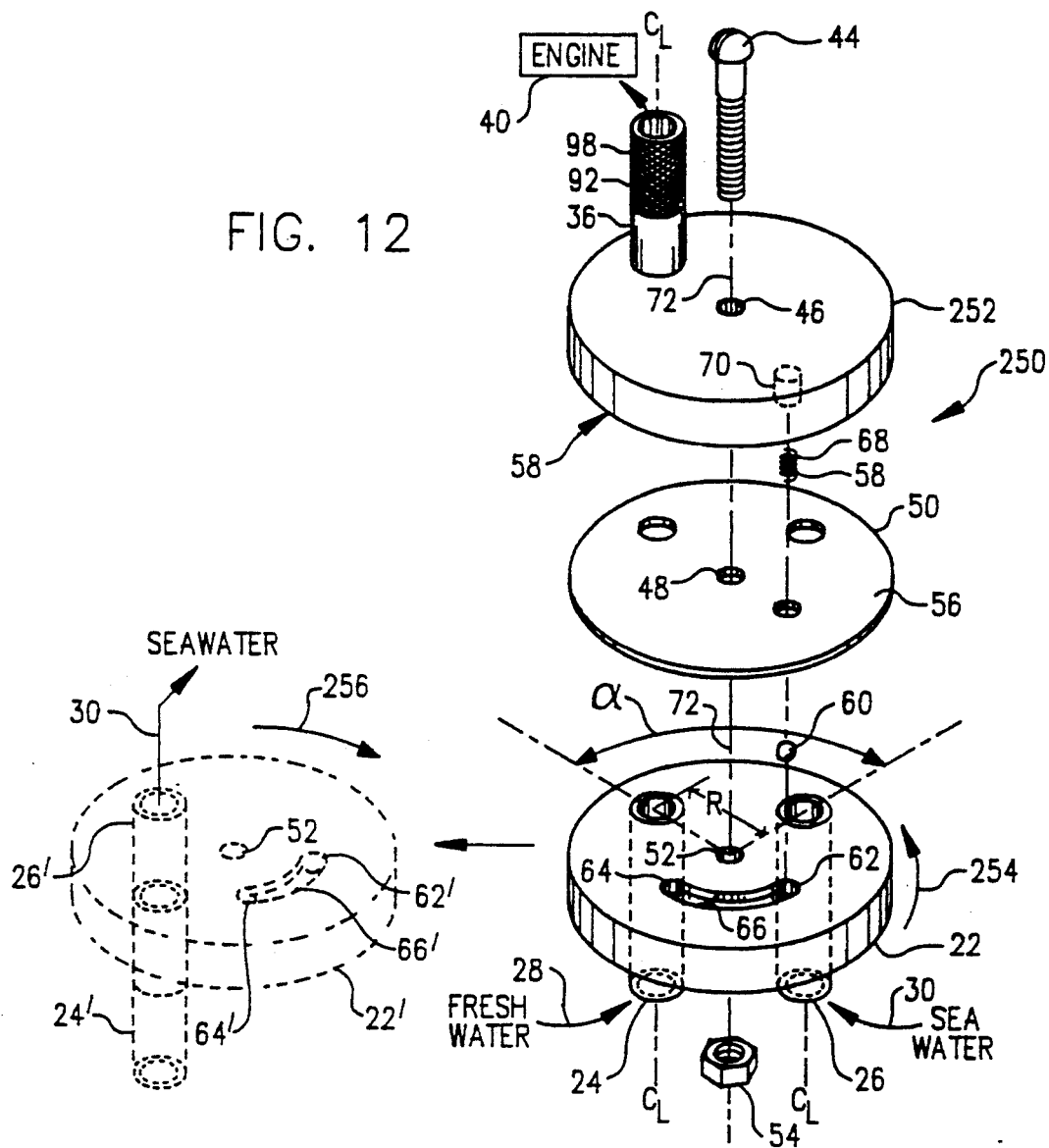
FIG. 12 is a sixth embodiment of my invention, showing a single outlet flush valve design as may be employed in inboard marine engines.

Turning now to FIG. 12, a flush valve 250 similar to FIG. 1 is illustrated, although the present device 250 has a single outlet conduit 36 located on outlet portion 252. Valve 250 is suitable for use in many inboard type marine engines where valve 250 can be located on the suction side of a coolant pump (not shown). Thus, seawater 30 may be supplied through valve 250 to an engine 40, by rotating inlet portion 22 in the direction indicated by arrow 254, until the position 22' is reached, as depicted in the hidden lines view of inlet portion 22' in this FIG. 12. Alternately, freshwater 28 may be supplied to engine 40 by positioning valve 250 by rotating the inlet portion 22' in the direction of arrow 256 by an angle alpha ($\alpha$) until the position of inlet portion 22 is reached as depicted in full lines in this FIG. 12. The angle alpha ($\alpha$) may be any convenient angle that provides adequate separation between inlet conduits 24 and 26 so as to avoid interference when connecting hoses thereto; I prefer using an angle alpha of about ninety degrees (90°). As it is unnecessary in the present case to dispose of seawater 30, the seawater flow can simply be sealed off. This is unlike the normal situation for coolant flow in inboard-outboard type marine engines, for example as in the case set forth in FIG. 1 above, wherein seawater 30 is constantly pumped toward a flush valve 20, thus necessitating the provision for continuous disposal of seawater 30 therethrough. Otherwise, components and operation of valve 250 are as set forth for valve 20 in FIG. 1, or alternately in FIG. 10 above.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalences of the claims are therefore intended to be embraced therein.

What is claimed is:

1. A valve apparatus, said apparatus comprising:
   (a) a first end portion having first and second inlet conduits, said end portion including a first engaging surface having a axis of rotation extending therethrough;
   (b) a second end portion having first and second outlet conduits, said second end portion having a second engaging surface having an axis of rotation extending therethrough, wherein said first surface and second surface are rotatably secured together on said axis to allow said first end portion and said second end portion to be alternated between:
      (i) a first, single fluid communication relationship wherein said first inlet conduit allows flow of a first fluid therethrough and thence to a first outlet conduit, and
      (ii) a second, multiple fluid communication relationship wherein said first inlet conduit allows flow of said first fluid therethrough to a second outlet conduit and of a second fluid therethrough to said first outlet conduit, and
   (c) sealing means between said first and said second engaging surfaces for preventing liquid from escaping through the gap therebetween.

2. The device as defined in claim 1 wherein said sealing means is affixed to said first or to said second portion.

3. The device as defined in claim 1, wherein each of said inlet conduits and each of said outlet conduits have exterior surfaces, and wherein each of said exterior surfaces further includes friction increasing means adapted to increase the friction between said conduits and any external attachments thereto.

4. The device as defined in claim 3, wherein said friction increasing means comprises a knurled finish on at least a part of said exterior surfaces.

5. The device as defined in claims 3, wherein said friction increasing means comprises a barbed surface on at least a part of said exterior surfaces.

6. The device as defined in claim 1, further comprising a registration means at each of said first and second fluid communication positions.

7. The device as defined in claim 6, wherein said registration means further comprises a biased ball adapted to be received in a first detent or alternately in a second detent, both of said detents being located so as to receive said ball when said device is at said first or at said second fluid communication position.

* * * * *